United States Patent
Wu

(10) Patent No.: US 10,234,796 B1
(45) Date of Patent: Mar. 19, 2019

(54) TRANSFER ASSIST CHECK FILM MEMBERS

(71) Applicant: Xerox Corporation, Norwalk, CT (US)

(72) Inventor: Jin Wu, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/878,635

(22) Filed: Jan. 24, 2018

(51) Int. Cl.
*G03G 15/16* (2006.01)
*C09D 167/02* (2006.01)
*C09D 167/00* (2006.01)
*C09D 5/24* (2006.01)
*C08K 3/04* (2006.01)

(52) U.S. Cl.
CPC .............. *G03G 15/162* (2013.01); *C09D 5/24* (2013.01); *C09D 167/00* (2013.01); *C09D 167/02* (2013.01); *C08K 3/04* (2013.01)

(58) Field of Classification Search
CPC .. G03G 15/162; C09D 167/02; C09D 167/00; C09D 5/24; C08K 3/04
See application file for complete search history.

(56) References Cited

U.S. PATENT DOCUMENTS

2015/0227088 A1* 8/2015 Wu ..................... G03G 15/162
399/297

* cited by examiner

*Primary Examiner* — Thorl Chea
(74) *Attorney, Agent, or Firm* — Hoffman Warnick LLC

(57) ABSTRACT

A transfer assist member comprising a plurality of layers, one of the layers being a check film layer comprising a mixture of a polymer and a conductive component in contact with a layer of a polyalkylene furandicarboxylate.

23 Claims, 4 Drawing Sheets

TRANSFER ASSIST CHECK FILM MEMBERS

This disclosure is generally directed to transfer assist members comprising a plurality of layers, one of which layers is a check film comprising a polyalkylene furandicarboxylate layer in contact with a layer comprising a mixture of a conductive component and a polymer.

BACKGROUND

Certain xerographic systems containing as components non-bio-degradable materials, such as for example, polymers prepared from bisphenol A are known. The environmental issues relating to the use of bisphenol A and other toxic chemicals have been well documented, especially as these chemicals adversely affect human beings, animals, trees, plants, fish, and other resources. Also, it is known that non-biodegradable materials and toxic chemicals usually cannot be safely recycled, are costly to prepare, cause the pollution of the world's water, add to the carbon footprint, and reduce the oil and coal reserves. Thus, desirable is the development of green materials, such as polymers that are biodegradable, that minimize the economic impacts and uncertainty associated with the reliance on petroleum imported from unstable regions, and that reduce the carbon footprint by, for example, about a 50 percent reduction.

Biodegradable (bio, or bio-based) polymers have been referred to as a group of materials that respond to the action of enzymes, and that chemically degrade by their interaction with living organisms. Biodegradation may also result from chemical reactions that are initiated by photochemical processes, oxidation and hydrolysis, and other environmental factors. Also, biodegradable polymers can include a number of synthetic polymers that possess chemical functionalities present in naturally occurring compounds. However, a number of these polymers can be costly to prepare, may not be fully biodegradable, and may decompose resulting in emitting carbon to the environment.

The transfer of toner developed images from a photoconductor to an image support substrate, like a sheet of paper, involves overcoming cohesive forces holding the toner particles to the photoconductor. The interface between the photoconductor surface and the image support substrate may not in many instances be optimal, thus, in the transfer process when spaces or gaps exist between the developed image and the image support substrate developed image quality is decreased. Therefore, there is a tendency for toner, or portions thereof, not to transfer across these gaps causing variable transfer efficiency, which in turn can create areas of low transfer, or no transfer resulting in image transfer deletion where relevant information is not reproduced on the image support substrate.

Also, non-flat or uneven image support substrates, such as paper, that have been mishandled, left exposed to the environment, or previously passed through a fixing operation, with heat and/or pressure fusing, tend to result in poor contact with the surface of the photoconductor. Further, in the event the copy sheet is wrinkled it will not be in sufficient, uniform, and continuous contact with the photoconductor surface and spaces, or air gaps will form between the developed image on the photoconductive surface and the image support substrate.

Cumbersome mechanical devices that force the image support substrate into contact with the image bearing surface have also been incorporated into xerographic transfer systems. These devices, such as rollers, have been used to force the image support substrate, or a sheet of paper into intimate and substantially uniform contact with the image bearing surface. For example, there can be selected devices containing an electrically biased transfer roll system in an attempt to minimize image deletions.

Image transfer deletion is undesirable in that portions of the developed image may not be fully reproduced on the substrate to which the image is transferred. For example, a transfer assist blade that contacts the photoconductor will in many instances retrieve residual dirt and toner from the photoconductor surface that can be conveyed to the transfer assist blade resulting in unacceptable, or poor print quality defects. Further, continuous frictional contact between the blade and the photoconductor may cause permanent damage to the photoreceptor.

In single pass color machines, it is desirable that minimal disturbance to the photoconductor results so that motion errors are not formed along the photoconductor causing image quality and color separation registration problems. This disturbance, which is often referred to as trail edge flip, can cause image defects on the substrate sheet due to the motion of the sheet during transfer generated by energy released because of the bending forces of the sheet. Thus, in machines which handle a large range of paper weights and sizes, it is difficult to have a sheet guide which can properly position any weight and size sheet while not causing the sheet to oscillate after having come into contact with the photoconductor.

With multicolor electrophotography, where there is selected a machine architecture which comprises a plurality of image forming stations, toner developed images can be of poor image quality because of the insufficient transfer of the toner particles present on a photoconductor. One example of the plural image forming station architecture utilizes an image-on-image (IOI) system in which the photoconductor member is recharged, reimaged and developed for each color. The charging, imaging, developing and recharging, reimaging and developing, all followed by transfer of the image to paper, can be completed in a single revolution of the photoconductor referred to as single pass, while multi-pass architectures form each color separation with a single charge, image and develop sequence, with separate image transfer operations for each color.

There is a need for transfer assist members that substantially avoid or minimize the disadvantages illustrated herein.

Further, there is a need for transfer assist members that include a check film comprising a more environmentally acceptable polymer.

Also, there is a need for transfer assist members that are wear resistant and that can be used for extended time periods without being replaced.

Additionally, there is a need for transfer assist members that possess excellent mechanical properties, desirable glass transition temperatures, and acceptable modulus especially as compared, for example, to the environmentally damaging polyethylene terephthalates.

There is also a need for transfer assist members that permit the continuous and uniform contact between a photoconductor and the substrate to which a developed toner image is to be transferred, and processes for enhancing contact between a copy sheet substrate and a developed image positioned on a photoconductive member.

Yet another need resides in providing xerographic printing systems, inclusive of multi-color generating systems, where there is selected a transfer assist member that maintains sufficient constant pressure on the substrate to which a developed image is to be transferred, thus substantially eliminating air gaps between the substrate and the photoconductor, which gaps can cause air breakdown in the transfer field.

Further, there is a need for transfer assist members that enable suitable and full contact of the developed toner image present on a photoconductor with a substrate to which the developed image is to be transferred.

Additionally, there is a need for transfer assist members that contain durable compositions that can be economically and efficiently manufactured, and where the amount of energy consumed is reduced.

Yet additionally, there is a need for a multilayered transfer assist member that includes as one layer an environmentally acceptable bio-based generated polymer check film located on the side exposed to xerographic corona charging wires.

Also, there is a need for transfer assist members where the transfer assist member check film layer can be generated roll to roll by extrusion processing.

Further, there is a need for transfer assist members with a combination of excellent durability that exert sufficient constant pressure on a substrate and permit the substrate to fully contact the toner developed image on a photoconductor, which members provide mechanical pressure from, for example, about 20 to about 30 percent of its function, and electrostatic pressure/tailoring of, for example, from about 70 to about 80 percent of its function, and where there results excellent transfer of a developed image to a suitable substrate, such as, for example, from about 90 percent transfer to about 100 percent transfer, from about 95 percent transfer to about 100 percent transfer, from about 90 percent transfer to about 98 percent transfer, or from about 95 transfer to about 99 percent transfer, and where blurred final images are minimized or avoided.

Moreover, there is a need for composite transfer assist blades that overcome or minimize the problems associated with a single component blade which does not provide sufficient consistent contact force to the back of a substrate to enable complete image transfer, and causing developed image deletions and color shift.

Yet, there is another need for transfer assist members useful in electrophotographic imaging apparatuses, including digital printing where the latent image is produced by a modulated laser beam, or ionographic printing where charge is deposited on a charge retentive surface in response to electronically generated images or stored images.

These and other needs are believed to be achievable with the disclosed transfer assist members.

SUMMARY

Disclosed is a check film comprising a polyalkylene furandicarboxylate layer in contact with a layer comprising a mixture of a conductive component and a polymer.

Also, disclosed is a transfer assist member comprising a plurality of layers, one of said layers being a check film layer comprising a polyalkylene furandicarboxylate layer, and thereover a layer comprising a mixture of a conductive component and a polymer.

Further, disclosed is a xerographic process for providing substantially uniform contact between a copy substrate and a toner developed image located on an imaging member, comprising providing a flexible transfer assist blade comprising a plurality of attached layers, wherein said transfer flexible transfer assist blade is adapted to move from a non-operative position spaced from the imaging member to an operative position in contact with the copy substrate, and in the presence of a corona device, applying pressure against the copy substrate in a direction toward the imaging member, and wherein said plurality of layers comprises a check film layer comprising a polyalkylene furandicarboxylate, and thereover a layer comprising a mixture of a conductive component and a polymer, at least one adhesive layer, at least one thermoplastic layer, and a wear resistant layer where the wear resistant layer is moved into contact with the backside of the copy substrate.

Yet further, disclosed are processes for the preparation of improved environmentally friendly green check films comprising generating a partially conductive polymer containing dispersion, coating the resulting dispersion onto a polyalkylene furandicarboxylate substrate via extrusion methods, applying a wear resistant layer to the check film, where the wear resistant layer of the check film contacts the backside of a substrate such as paper, and where the obtained check film is selected for the preparation of transfer assist members.

Transfer assist member plurality of layers refers, for example, to from about 1 layer to about 25 layers, from about 2 layers to about 20 layers, from about 2 layers to about 15 layers, from about 2 layers to about 10 layers, from about 3 layers to about 9 layers, from about 4 layers to about 7 layers, from about 5 layers to about 6 layers, and other numbers of suitable layers.

At least one layer, such as for the check film, refers, for example, to one layer, from one layer to about 12 layers, from one layer to about 10 layers, from one layer to about 7 layers, from about 2 layers to about 5 layers, and other numbers of suitable layers.

FIGURES

The following Figures are provided to illustrate check films and transfer assist members thereof.

EMBODIMENTS

Each of the disclosed transfer assist members comprise a mixture of a polymer and a conductive component present as a coating on a polyalkylene furandicarboxylate layer, and where the members apply sufficient, and substantially continuous pressure against a copy substrate like a sheet of paper to create uniform contact between the copy substrate, and a developed image formed on a photoconductor. The transfer assist member, such as, for example, a transfer assist blade, presses a copy substrate into contact with the developed image on the photoconductor surface to thereby substantially eliminate any spaces or gaps between the copy substrate and the developed image during transfer of the developed image from the photoconductive surface to the copy substrate, and where in embodiments a wear resistant layer is moved into contact with the copy substrate.

Figure 1:
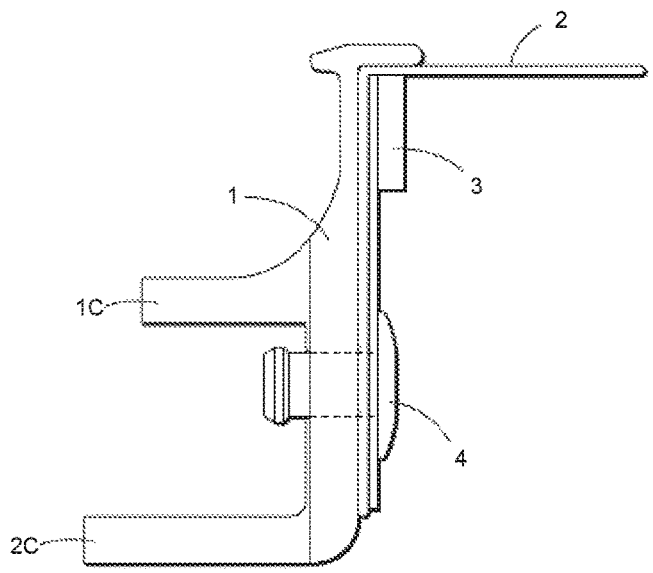
FIG. 1 and FIG. 1A illustrate exemplary side views of the transfer assist member assembly of the present disclosure.

FIG. 1 illustrates a side view of the transfer assist member assembly of the present disclosure. More specifically, illustrated in FIG. 1 is an aluminum component 1 to secure the member, such as a blade (illustrated herein in FIG. 2), and which component 1 generated, for example, by extrusion processes is attached to the transfer assist member assembly 2, and where the assembly 2 is comprised of the layered blade member as shown in FIG. 3, and where the numeral or designation 3 (shown in FIGS. 1, 1A and 2) represents a stainless steel clamp, and the designation 4 (shown in FIGS. 1, 1A and 2) represents an aluminum rivet, whereby the clamp 3 and the rivet 4 retain in position the assembly 2 between clamp 3 and aluminum component 1, and where 1C and 2C represent spaced-apart integral arms of element 1.

Figure 1A:
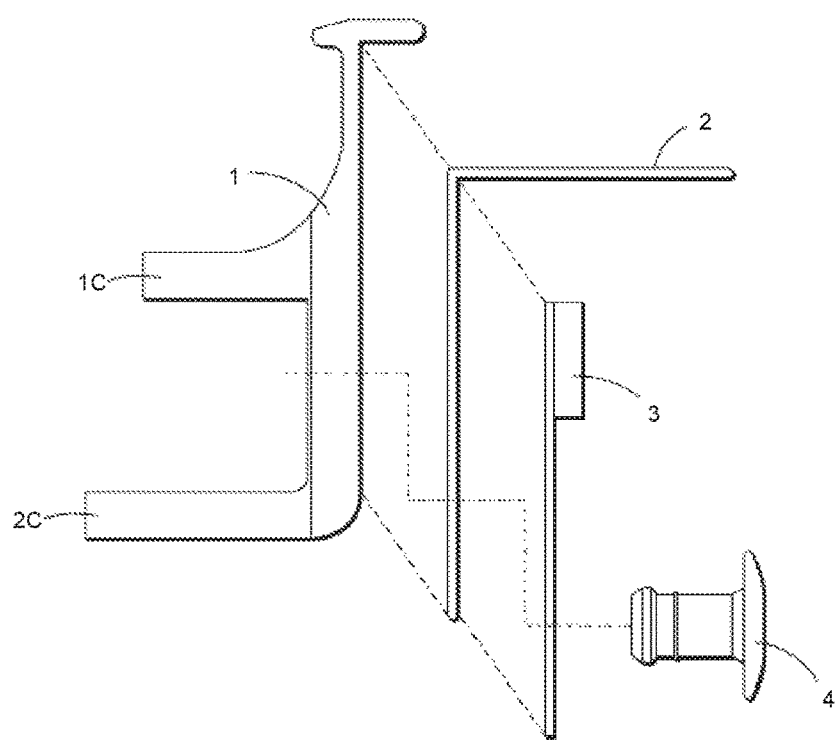

The corresponding FIG. 1A illustrates the disassembled elements of a transfer assist member where the designations 1, 2, 3, 4, 1C and 2C for this FIG. 1A are the same as those designations as shown in FIG. 1.

Figure 2:
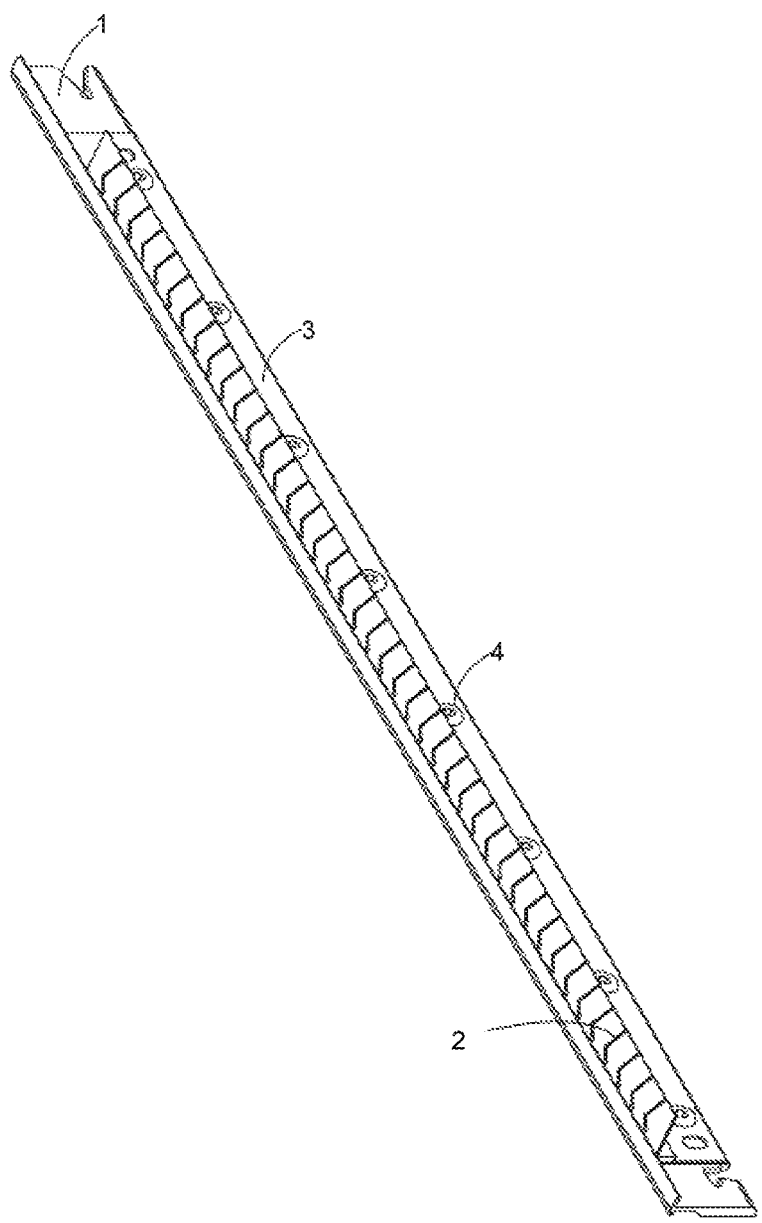
FIG. 2 illustrates an exemplary view of the transfer assist member assembly blade of the present disclosure.
Figure 3:
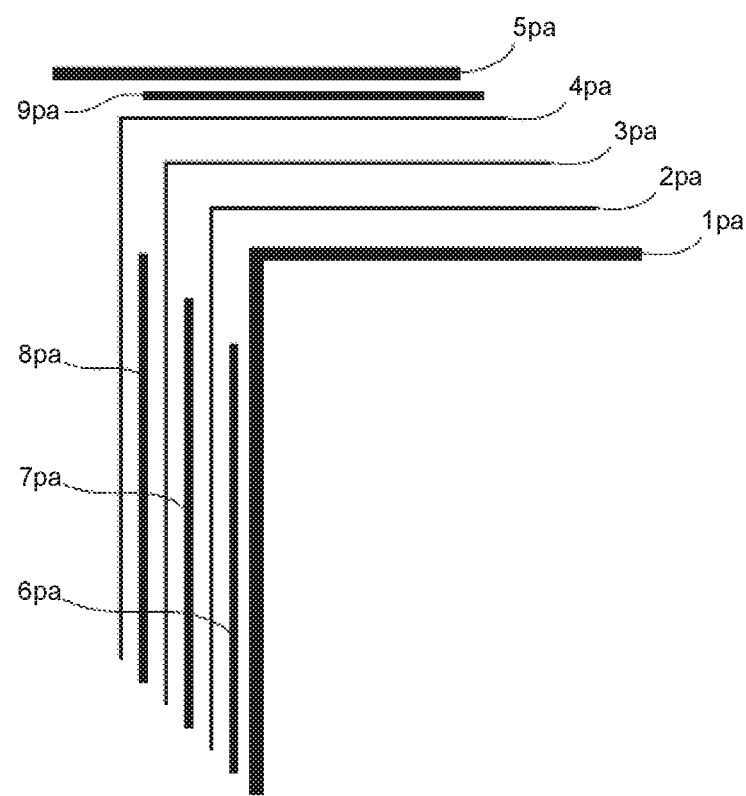
FIG. 3 illustrates an exemplary view of the transfer assist member petal assembly of the present disclosure.

FIG. 2 illustrates a view of the transfer assist member assembly of the present disclosure, and where the designations 1, 2, 3, 4 for this Figure are the same as the designations as presented in FIG. 1, that is aluminum component 1 to secure the member, such as a blade, and which blade is generated, for example, by extrusion processes, attached to the transfer assist member petal assembly 2, and where the petal assembly 2 comprises, for example, the blade member as shown in FIG. 3, and where numeral or designation 3 represents a stainless steel clamp, and designation 4 represents an aluminum rivet.

FIG. 3 illustrates a transfer assist member petal assembly of the present disclosure. Specifically, the transfer assist member petal assembly comprises the disclosed check film layer 1*pa*, which itself comprises a polyalkylene furandicarboxylate substrate, such as a bio-based generated polyethylene furandicarboxylate substrate coated with a partially conductive layer mixture of a conductive component and a polymer. The transfer assist member petal assembly further includes a top overcoat wear resistant layer 5*pa*, and at least one or more thermoplastic polymer layers 2*pa*, 3*pa*, and 4*pa* that primarily function as supporting buffer layers between the check film layer 1*pa* and the top layer 5*pa*; and which member may also include at least one or more optional adhesive layer, 6*pa*, 7*pa*, 8*pa* and 9*pa* between the respective pairs of layers 1*pa* and 2*pa*, 2*pa* and 3*pa*, 3*pa* and 4*pa*, 4*pa* and 5*pa*, as shown in FIG. 3.

Figure 4:
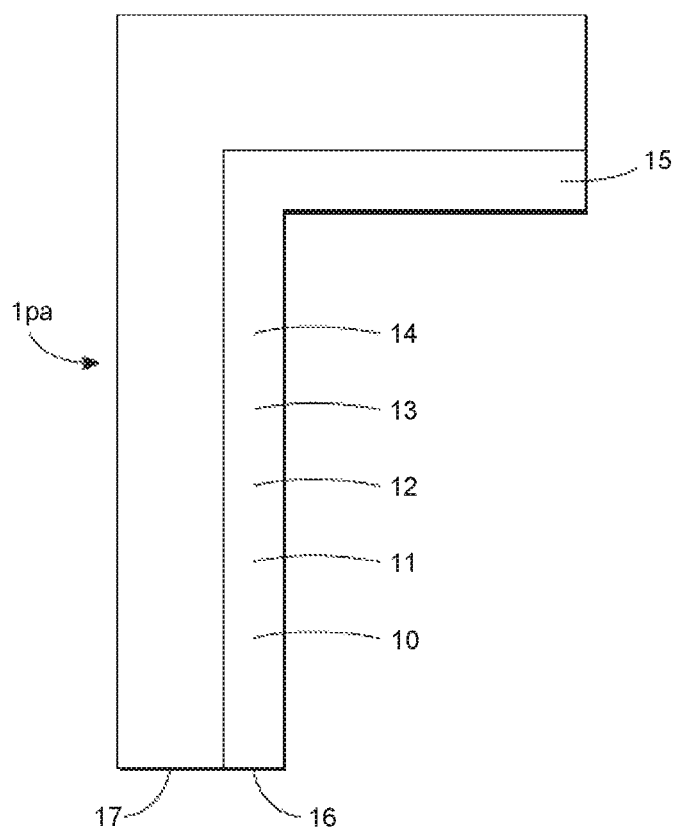
FIG. 4 illustrates an exemplary view of the check film of the present disclosure.

FIG. 4 illustrates the components of the transfer assist member check film of the present disclosure. More specifically, shown in FIG. 4 is an embodiment of the check film 1*pa* comprised of a polyalkylene furandicarboxylate supporting substrate layer 17, and a partially conductive polymer layer thereover 16, which layer 16 is comprised of polymers 10, conductive components or fillers 11, optional silicas 12, optional fluoropolymers 13, optional plasticizers 14, and optional leveling agents 15.

Polymers

Various polymers can be selected for the disclosed transfer assist members, such as the check film layer of FIG. 4, designation 16, that together with a charging device, such as corona wires, assist in performing the developed image transfer to a substrate like paper. Generally, coating or layer 16 includes a mixture of a conductive component and a polymer, which mixture has, for example, a surface resistance intermediate between insulators and conductors, such as for example, a surface resistivity of from about $10^7$ Ω/square to about $10^{10}$ Ω/square (ohm/square), from about $1\times10^7$ Ω/square to about $10\times10^9$ Ω/square, from about $10^8$ Ω/square to about $10^{10}$ Ω/square, from about $10^8$ Ω/square to about $10^9$ Ω/square, from about $1\times10^7$ Ω/square to about $9.99\times10^9$ Ω/square, from about $1\times10^7$ Ω/square to about $10\times10^8$ Ω/square, from about $1\times10^8$ Ω/square to about $9.9\times10^9$ Ω/square, or about $5\times10^8$ Ω/square (5.0E8 ohm), and which resistivity can be determined or measured by a known Resistance Meter.

Examples of polymers that can be selected for layer 16 include thermoplastics, polycarbonates, polysulfones, polyesters, such as aliphatic polyesters of, for example, polyglycolic acids, polylactic acids, and polycaprolactones, and aliphatic copolyesters, such as polyethylene adipates and polyhydroxyalkanoates. Specific examples of polyesters selected for the partially conductive layer 16 are, for example, VITEL® 1200B ($T_g$=69° C., $M_w$=45,000, a copolyester prepared from ethylene glycol, diethylene glycol, terephthalic acid, and isophthalic acid), 3300B ($T_g$=18° C., $M_w$=63,000), 3350B ($T_g$=18° C., $M_w$=63,000), 3200B ($T_g$=17° C., $M_w$=63,500), 3550B ($T_g$=−11° C., $M_w$=75,000), 3650B ($T_g$=−10° C., $M_w$=73,000), 2200B ($T_g$=69° C., $M_w$=42,000), a copolyester prepared from ethylene glycol, diethylene glycol, neopentyl glycol, terephthalic acid, and isophthalic acid, 2300B ($T_g$=69° C., $M_w$=45,000), all available from Bostik Incorporated.

The disclosed glass transition temperatures (Tg) can be determined by a number of known methods, and more specifically, such as by Differential Scanning calorimetry (DSC). For the disclosed molecular weights, such as $M_w$ (weight average) and $M_n$ (number average), they can be measured by a number of known methods, and more specifically, by Gel Permeation Chromatography (GPC).

The layer 16 polymer can be present in a number of differing effective amounts, such as for example, from about 30 weight percent to about 99 weight percent, in those situations when other optional components, such as plasticizers and leveling agents may not be present, from about 60 weight percent to about 97 weight percent, from about 70 weight percent to about 95 weight percent, from about 75 weight percent to about 92 weight percent, or from about 80 weight percent to about 87 weight percent of the total solids, and providing the total percent of components present is about 100 percent.

Conductive Components

The polymer containing layer 16 also comprises conductive components, such as known carbon forms like carbon black, graphite, carbon nanotube, fullerene, graphene, and the like; metal oxides, mixed metal oxides, and mixtures thereof; and polymers that have conductive characteristics, such as polyaniline, polythiophene, polypyrrole, mixtures thereof, and the like.

Examples of carbon black conductive components 11, that can be selected for incorporation into layer 16 illustrated herein include KETJENBLACK® carbon blacks available from AkzoNobel Functional Chemicals, special black 4 (B.E.T. surface area=180 m$^2$/g, DBP absorption=1.8 ml/g, primary particle diameter=25 nanometers) available from Evonik-Degussa, special black 5 (B.E.T. surface area=240 m$^2$/g, DBP absorption=1.41 ml/g, primary particle diameter=20 nanometers), color black FW1 (B.E.T. surface area=320 m$^2$/g, DBP absorption=2.89 ml/g, primary particle diameter=13 nanometers), color black FW2 (B.E.T. surface area=460 m$^2$/g, DBP absorption=4.82 ml/g, primary particle diameter=13 nanometers), color black FW200 (B.E.T. surface area=460 m$^2$/g, DBP absorption=4.6 ml/g, primary particle diameter=13 nanometers), all available from Evonik-Degussa; VULCAN® carbon blacks, REGAL® carbon blacks, MONARCH® carbon blacks, EMPEROR® carbon blacks, and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m²/g, DBP absorption=0.61 ml/g), BLACK PEARLS® 570 (B.E.T. surface area=110 m²/g, DBP absorption=1.14 ml/g), BLACK PEARLS® 170 (B.E.T. surface area=35 m²/g, DBP absorption=1.22 ml/g), EMPEROR® 1200, EMPEROR® 1600, VULCAN® XC72 (B.E.T. surface area=254 m²/g, DBP absorption=1.76 ml/g), VULCAN® XC72R (fluffy form of VULCAN® XC72), VULCAN® XC605, VULCAN® XC305, REGAL® 660 (B.E.T. surface area=112 m²/g, DBP absorption=0.59 ml/g), REGAL® 400 (B.E.T. surface area=96 m²/g, DBP absorption=0.69 ml/g), REGAL® 330 (B.E.T. surface area=94 m²/g, DBP absorption=0.71 ml/g), MONARCH® 880 (B.E.T. surface area=220 m²/g, DBP absorption=1.05 ml/g, primary particle diameter=16 nanometers), and MONARCH® 1000 (B.E.T. surface area=343 m²/g, DBP absorption=1.05 ml/g, primary particle diameter=16 nanometers); special carbon blacks available from Evonik Incorporated; and Channel carbon blacks available from Evonik-Degussa. Other known suitable carbon blacks not specifically disclosed herein may be selected as the conductive component.

Examples of polyaniline conductive components that can be selected for incorporation into the disclosed layer 16 are PANIPOL™ F, commercially available from Panipol Oy, Finland, and known lignosulfonic acid grafted polyanilines. These polyanilines usually have a relatively small particle size diameter of, for example, from about 0.5 micron to about 5 microns; from about 1.1 microns to about 2.3 microns, or from about 1.5 microns to about 1.9 microns.

Metal oxide conductive components 11 that can be selected for the disclosed layer 16 include, for example, tin oxide, antimony doped tin oxide, indium oxide, indium tin oxide, zinc oxide, titanium oxide, mixtures thereof, and the like. Mixed metal oxides include, for example, tin oxide and antimony doped tin oxide, tin oxide and indium oxide, tin oxide and zinc oxide, antimony doped tin oxide and indium tin oxide, zinc oxide and titanium oxide, titanium oxide and tin oxide, antimony doped tin oxide, zinc oxide and titanium oxide, indium oxide, titanium oxide, and tin oxide, antimony doped tin oxide, indium oxide, and titanium oxide, mixtures thereof, and the like.

The conductive component amount is, for example, from about 1 weight percent to about 70 weight percent, from about 3 weight percent to about 40 weight percent, from about 5 weight percent to about 30 weight percent, from about 8 weight percent to about 25 weight percent, or from about 13 weight percent to about 20 weight percent of the total solids, and providing the total percent of solids present is about 100 percent.

The conductive layer mixture coating 16 can be included in a number of thicknesses, such as for example from about 0.1 micron to about 50 microns, from about 1 micron to about 40 microns, from about 5 microns to about 30 microns, or from about 10 microns to about 15 microns.

Optional Plasticizers

Optional plasticizers that primarily function to increase the plasticity or fluidity of a material like the polymer selected for the disclosed transfer assist member layer 16 include diethyl phthalate (DEP), dioctyl phthalate, diallyl phthalate, polypropylene glycol dibenzoate, di-2-ethyl hexyl phthalate, diisononyl phthalate, di-2-propyl heptyl phthalate, diisodecyl phthalate, di-2-ethyl hexyl terephthalate, other known suitable plasticizers, mixtures thereof, and the like. The plasticizers can be present in various effective amounts, such as for example, from about 0.1 weight percent to about 30 weight percent, from about 1 weight percent to about 20 weight percent, or from about 3 weight percent to about 15 weight percent based on the solids, and providing that the total amount of solids present is equal to about 100 percent.

Optional Leveling Agents

Optional leveling agent examples selected for the disclosed transfer assist member layer 16, which agent can contribute to the smoothness characteristics, such as enabling smooth coated surfaces with minimal, or no blemishes or protrusions of the members and blades illustrated herein include, for example, polysiloxane polymers. The optional polysiloxane polymers selected include, for example, a polyester modified polydimethylsiloxane with the tradename of BYK® 310 (about 25 weight percent in xylene) and BYK® 370 (about 25 weight percent in xylene/alkylbenzenes/cyclohexanone/monophenylglycol=75/11/7/7); a polyether modified polydimethylsiloxane with the tradename of BYK® 333, BYK® 330 (about 51 weight percent in methoxypropylacetate) and BYK® 344 (about 52.3 weight percent in xylene/isobutanol=80/20), BYK®-SILCLEAN 3710 and 3720 (about 25 weight percent in methoxypropanol); a polyacrylate modified polydimethylsiloxane, with the tradename of BYK®-SILCLEAN 3700 (about 25 weight percent in methoxypropylacetate); or a polyester polyether modified polydimethylsiloxane with the tradename of BYK® 375 (about 25 weight percent in di-propylene glycol monomethyl ether), all commercially available from BYK Chemical, mixtures thereof and the like. The leveling agents for the check film are selected in various effective amounts, such as for example, from about 0.01 weight percent to about 5 weight percent, from about 0.1 weight percent to about 3 weight percent, and from about 0.2 weight percent to about 1 weight percent based on the solids present, and providing that the total amount of solids present is equal to about 100 percent.

Optional Silicas

Optional silica examples present in the disclosed transfer assist member layer 16, and which silicas can contribute to the wear resistant properties of the members and blades illustrated herein include silica, fumed silicas, surface treated silicas, other known silicas, such as AEROSIL R972®, mixtures thereof, and the like. The silicas are selected in various effective amounts, such as for example, from about 0.1 weight percent to about 20 weight percent, from about 1 weight percent to about 15 weight percent, and from about 2 weight percent to about 10 weight percent based on the solids, and providing that the total amount of solids present is equal to about 100 percent.

Optional Fluoropolymer Particles

Optional fluoropolymer particles selected for the disclosed transfer assist member layer 16, and which can contribute to the wear resistant properties of the members and blades illustrated herein include tetrafluoroethylene polymers (PTFE), trifluorochloroethylene polymers, hexafluoropropylene polymers, vinyl fluoride polymers, vinylidene fluoride polymers, difluorodichloroethylene polymers, or copolymers thereof. The fluoropolymer particles are selected in various effective amounts, such as for example, from about 0.1 weight percent to about 20 weight percent, from about 1 weight percent to about 15 weight percent, and from about 2 weight percent to about 10 weight percent based on the solids, and providing that the total amount of solids present is equal to about 100 percent.

Substrates

The check film substrate, such as layer 17, is comprised of at least one of a polyalkylene furandicarboxylate, such as a bio-based polyalkylene furandicarboxylate generated, for example, from renewal sources where alkylene contains, for example, from about 1 carbon atom to about 50 carbon atoms, from about 5 carbon atoms to about 25 carbon atoms, or from about 2 carbon atoms to about 18 carbon atoms. Alkylene of the polyalkylene furandicarboxylates contains, for example, from about 1 carbon atom to about 18 carbon atoms, from about 2 carbon atoms to about 12 carbon atoms, or from about 2 carbon atoms to about 6 carbon atoms.

Examples of polyalkylene furandicarboxylates include polyethylene furandicarboxylate (PEF), polyethylene 2,5-furandicarboxylate, polypropylene furandicarboxylate (PPF), polybutylene furandicarboxylate (PBF), polyalkylene furancarboxylates copolymers of polyethylene furandicarboxylate terephthalate, polypropylene furandicarboxylate terephthalate, polybutylene furandicarboxylate terephthalate, mixtures thereof, and the like, all believed to be available from Avantium Research Institute of Amsterdam Netherlands, and Toyobo Company Ltd. of Japan, and also available from the joint efforts of Avantium Research Institute of Amsterdam Netherlands and Toyobo Company Ltd. of Japan, and from the Stanford University Labs, or prepared as disclosed herein.

It is believed that the disclosed polyalkylene furandicarboxylates, inclusive of bio-based polyalkylene furandicarboxylates, can be prepared as illustrated in the *Journal of Energy and Environmental Science Issue* 4, 2012 titled *Replacing Fossil Based PET with Bio-based PEF*, listed authors A.J.J.E. Eerhart, A.P.C. Faaij, and M. K. Patel, the disclosure of which is totally incorporated herein by reference; *European Polymer Journal, Volume* 83, October 2016, Pages 202-229, listed authors of George Z. Papageorgiou, Dimitrios G. Papageorgiou, Zoi Terzopoulou, and Dim itrios N. Bikiaris, the disclosure of which is totally incorporated herein by reference; and *Nature* 531, *News and Views, Sustainable Chemistry: Putting Carbon Dioxide to Work, Mar.* 9, 2016, listed author Eric J. Beckman, the disclosure of which is totally incorporated herein by reference. Compared with known polyethylene terephthalate (PET) substrates, polyalkylene furandicarboxylates, such as polyethylene furandicarboxylates can be prepared from 100 percent renewable sources, from substances derived from living, or once-living organisms, such as renewable domestic agricultural products like plants, animal and marine substances, or forestry substances including biomass mixtures, soybeans, corn, flax, jute, and the like, thus permitting a reduction in the carbon footprint by at least 50 percent.

The polyalkylene furandicarboxylate substrate 17 can be of a number of different thicknesses, such as from about 25 microns to about 250 microns, from about 25 microns to about 150 microns, about 50 microns to about 125 microns, or from about 75 microns to about 150 microns, and where the check film total thickness is, for example, from about 1 to about 10 mils, from about 1 to about 8 mils, from about 1 mil to about 5 mils, from about 2 mils to about 4 mils, and more specifically, about 3.8 mils, measured by known means such as a Permascope.

A polyalkylene furandicarboxylate can be represented by the following formula/structure

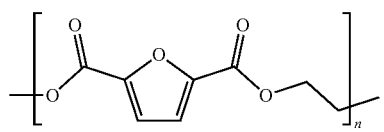

with n representing the number of repeating segments, and which n can be, for example, of a value of from about 50 to about 1,500, from about 100 to about 800, or from about 100 to about 500.

Optional Thermoplastic Polymer Layers

The optional thermoplastic polymer layers of at least one or more of, for example, 2*pa*, 3*pa*, and 4*pa*, are comprised, for example, of suitable polymers, such as, for example, MYLAR®, MELINEX®, TEIJIN®, TETORON®, and TEONEX®, considered to be biaxially oriented polyester films, which are commercially available in a variety of finishes and thicknesses, polycarbonates, polyvinyl halides, mixtures thereof and the like. These and other similar polymers are available from, for example, E.I. DuPont Company, Union Carbide, and SKC Incorporated. The thermoplastic polymer layers are each of an effective thin thickness of, for example, from about 1 mil to about 20 mils, from about 1 mil to about 12 mils, from about 5 mils to about 7 mils, and where one mil is equal to 0.001 of an inch (0.0254 mm).

Optional Adhesive Layers

In embodiments, the at least one, or more optional adhesive layer designated, for example, as 6*pa*, 7*pa*, 8*pa*, and 9*pa* can be included between each layer as shown in FIG. 3.

The optional adhesive layers, which can be included between, for example, each of the layers of the member of FIG. 3, can be present on the vertical sides between the substrate side of layer 1*pa* and layer 2*pa*, layer 2*pa* and 3*pa*, layer 3*pa* and 4*pa*, and on the horizontal sides between layer 4*pa* and the top wear layer 5*pa*. The horizontal sides of layers 1*pa*, 2*pa*, 3*pa* and 4*pa* are usually not bonded together.

A number of known adhesives can be selected for each adhesive layer, inclusive of suitable polyesters, such as Polyester 4900, a 3M™ Double Coated Tape 444, which is a 3.9 mil thick, 300 high tack acrylic adhesive with a 0.5 mil thick polyester carrier, densified Kraft paper liner (55 lbs.), mixtures thereof, and the like.

The thickness of each of the adhesive layer varies, for example, from about 1 millimeter to about 50 millimeters, from about 10 millimeters to about 40 millimeters, or from about 15 millimeters to about 25 millimeters as measured by a Permascope, or other known instruments.

Top Layer

The top, or wear resistant bonded layer designated, for example, by the numeral 5*pa*, illustrated in FIG. 3, can be comprised of various suitable known and commercially available materials, such as polyolefins like an ultra-high molecular weight polyethylene (UHMW), a wear-resistant plastic with a low coefficient of friction, excellent impact strength, and possessing chemical and moisture resistance. UHMW comprises long chains of polyethylene of the formula illustrated below, which all align in the same direction, and derives its strength largely from the length of each individual molecule (chain)

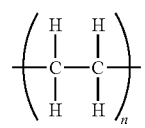

wherein n represents the number of repeating segments of, for example, from about 50,000 to about 375,000, from about 75,000 to about 325,000, from about 100,000 to about 300,000, from about 125,000 to about 200,000, or from about 150,000 to about 225,000.

The thickness of the disclosed top layer can vary depending, for example, on the thicknesses of the other layers that may be present and the components in each layer. Thus, for example, the thicknesses of the top wear resistant layer can be, for example, from about 1 mil to about 20 mils, from about 1 mil to about 15 mils, from about 2 mils to about 10 mils, or from about 1 mil to about 5 mils as determined by known means such as a Permascope.

Also included within the scope of the present disclosure are methods of imaging and printing with the transfer assist members and check films illustrated herein. These methods generally involve the formation of an electrostatic latent image on an imaging photoconductive member, followed by developing the image with a toner composition comprised, for example, of a thermoplastic resin, a colorant, such as a pigment, dye, or mixtures thereof, a charge additive, internal additives like waxes, and surface additives, such as for example, silica, coated silicas, aminosilanes, and the like; subsequently transferring with the disclosed transfer assist member the toner developed image to a suitable image receiving substrate, and permanently affixing the image thereto. In those environments where a printing mode is selected, the imaging method involves the same disclosed operation with the exception that exposure can be accomplished with a laser device or image bar. More specifically, the transfer assist members disclosed herein can be selected for the Xerox Corporation iGEN® machines, inclusive of the iGenF®, that generate with some versions over 125 copies per minute. Processes of imaging, especially xerographic imaging and printing, including digital and/or color printing, are thus encompassed by the present disclosure, and where the disclosed transfer assist member, such as a member in the configuration of a blade (TAB), sweeps the backside of the image support substrate with a constant sufficient force at the entrance to the toner developed transfer region. In embodiments, the top wear resistant layer of the TAB contacts the backside of the image support substrate directly, and where the disclosed check film does not contact the image support layer.

Specific embodiments will now be described in detail. These examples are intended to be illustrative, and are not limited to the materials, conditions, or process parameters set forth in these embodiments. All parts are percentages by solid weight unless otherwise indicated.

Example I

There is prepared a transfer assist blade check film as follows:

Preparation of the Partially Conductive Polymer Coating Dispersion 3.26 Grams of EMPEROR® 1200 (a carbon black available from Cabot Company) is mixed with 2.17 grams of VITEL® 1200B (a polyester copolymer obtainable from Bostik Incorporated), and 19.57 grams of methylene chloride. The resulting mixture is ball milled with 2 millimeter diameter stainless steel shots at 200 rpm for 20 hours. Thereafter, the resulting carbon black/polyester mixture is then separated from the stainless steel shots by filtration.

17.86 Grams of VITEL® 1200B and 160.71 grams of methylene chloride are mixed, and can then be added to the above prepared carbon black/polyester mixture. Furthermore, 1.16 grams of diethyl phthalate (DEP) and 0.02 gram of BYK® 333 (a polysiloxane copolymer obtainable from BYK Chemie) may also be added to the aforementioned obtained mixture. The resulting mixture is allowed to mix for 8 hours, and then this mixture can be filtered through a 20 micron NYLON® cloth filter to obtain, it is believed, a partially conductive coating dispersion.

Check Film Preparation

The above prepared partially conductive dispersion is coated on top of, that is thereover, a 75 micron thick bio-based generated polyethylene furandicarboxylate substrate layer (PEF) using a draw bar coater, and the resulting coating is subsequently dried at 125° C. for 2 minutes. The coating comprises EMPEROR® 1200/VITEL® 1200B/DEP/BYK® 333 in a weight ratio of 13.3/81.8/4.8/0.1 overlaying the 75 micron thick (PEF) film layer. The coating is believed to have a surface resistivity of about 5×10⁸ Ω/square (5.0 E8 ohm/square) as is measured by a known Trek Model 152-1 Resistance Meter, and a thickness of from about 10 microns to about 15 microns, which thickness can be measured with a known Permascope.

Preparation of the Petal Assembly Blade

The above prepared disclosed check film (about 10 to 15 microns thick partially conductive polymer layer present on the 75 micron thick PEF layer), and three separate 5 mil thick MYLAR® layers are cut into 4 millimeters by 38 millimeters strips, and the strips are aligned in sequence. Each adjacent pair of the aforementioned MYLAR® layers are bonded together using 3M™ Double Coated Tape 444 in between from the edges of the long sides to about 2.5 millimeters inside. The partially conductive bonded layers are folded rendering the 2.5 millimeters wide bonded layers into a vertical position, and the 1.5 millimeters wide unbounded layers into a horizontal position.

The UHMW polyethylene, obtained from E.I. DuPont, of the following formula/structure wear resistant layer

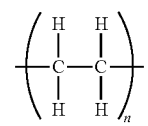

wherein n represents the number of repeating segments of from about 150,000 to about 225,000, is then coated as the top layer to the horizontal section of the top MYLAR® layer. The horizontal sections of the layers may then be cut into about 40 smaller segments with unique shapes such as rectangular shapes.

Preparation of the Transfer Assist Member Assembly

The aluminum extruded element, such as element 1 of FIG. 1, is then attached to the above transfer assist member petal assembly blade, then attached to a transfer assist member stainless steel clamp assembly, and the transfer assist member aluminum rivet illustrated, for example, in FIGS. 1 and 2.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A check film comprising a polyalkylene furandicarboxylate layer in contact with a layer comprising a mixture of a conductive component and a polymer.

2. The check film in accordance with claim 1 wherein said polyalkylene contains alkylene of from 1 carbon atom to 18 carbon atoms, and wherein said check film comprising said polyalkylene furandicarboxylate layer is coated thereover with said layer comprising said mixture of said conductive component and said polymer, and further including at least one adhesive layer, and at least one thermoplastic layer and a top wear resistant layer of a polyethylene as represented by the following formula/structure

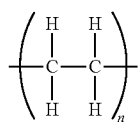

wherein n represents the number of repeating segments and is from 50,000 to 375,000.

3. The check film in accordance with claim 1 wherein said polyalkylene furandicarboxylate layer is a bio-based generated polyethylene 2,5-furandicarboxylate represented by the following formula/structure

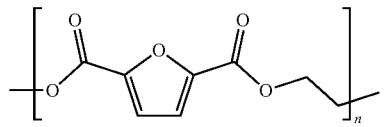

wherein n represents the number of repeating segments, and is from 100,000 to 300,000.

4. The check film in accordance with claim 1 wherein said polyalkylene furandicarboxylate layer is a bio-based generated polyalkylene furandicarboxylate of a thickness of from 25 microns to 150 microns, and said layer comprising said mixture of said conductive component, and said polymer is of a thickness of from 5 microns to 30 microns.

5. The check film in accordance with claim 1 wherein said polymer is a polyester, said conductive component is a surface treated carbon back, and wherein said mixture of said polymer and said conductive component possesses a surface resistivity of from $10^8$ Ω/square to $10^{10}$ Ω/square as measured by a Resistance Meter.

6. The check film in accordance with claim 1 wherein for said layer comprising a mixture of said conductive component and said polymer, said polymer is a polyester, said conductive component is a carbon black, and said polyalkylene furandicarboxylate is a bio-based generated polyethylene 2,5-furandicarboxylate.

7. The check film in accordance with claim 1 wherein said polyalkylene furandicarboxylate is a copolymer selected from the group consisting of polyethylene furandicarboxylate terephthalate, polypropylene furandicarboxylate terephthalate, and polybutylene furandicarboxylate terephthalate.

8. The check film in accordance with claim 1 wherein said polymer is a polyester, said conductive component is selected from the group consisting of carbon black, graphite, carbon nanotube, fullerene, graphene, metal oxides, mixed metal oxides, and mixtures thereof, and said polyalkylene furandicarboxylate is a bio-based generated polyethylene furandicarboxylate, where said mixture of said polymer and said conductive component possesses a surface resistivity of from $10^7$ Ω/square to about $10^{10}$ Ω/square as measured by a Resistance Meter, and optionally wherein said mixture further includes a plasticizer and a leveling agent.

9. The check film in accordance with claim 8 wherein said plasticizer is present and is selected from the group consisting of diethyl phthalate, dioctyl phthalate, diallyl phthalate, polypropylene glycol dibenzoate, di-2-ethyl hexyl phthalate, diisononyl phthalate, di-2-propyl heptyl phthalate, diisodecyl phthalate, and di-2-ethyl hexyl terephthalate, and said leveling agent is present and is selected from the group consisting of a polyester modified polydimethylsiloxane, a polyether modified polydimethylsiloxane, a polyacrylate modified polydimethylsiloxane, and a polyester polyether modified polydimethylsiloxane, and mixtures thereof.

10. A transfer assist member comprising a plurality of layers, one of said layers being a check film layer comprising a polyalkylene furandicarboxylate layer, and thereover a layer comprising a mixture of a conductive component and a polymer.

11. The transfer assist member in accordance with claim 10 wherein said polymer is a polyester, said conductive component is a carbon black, and said polyalkylene furandicarboxylate is a bio-based generated furandicarboxylate represented by the following formula/structure

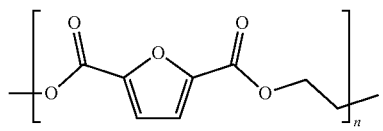

where n represents the number of repeating segments of from 50 to 1,500.

12. The transfer assist member in accordance with claim 10 wherein said polyalkylene furandicarboxylate is a bio-based polyethylene furandicarboxylate, and said mixture of said polymer, and said conductive component possesses a surface resistivity of from $10^8$ Ω/square to $10^9$ Ω/square as measured by a Resistance Meter.

13. The transfer assist member in accordance with claim 10 wherein said polymer is a polyester, said conductive component is a carbon black, said mixture layer is partially conductive, and said polyalkylene furandicarboxylate is selected from the group consisting of a bio-based generated polyethylene furandicarboxylate, a bio-based generated polypropylene furandicarboxylate, and a bio-based generated polybutylene furandicarboxylate, and further including a top wear resistant layer of a polyethylene as represented by the following formula/structure

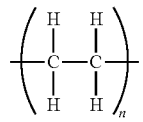

wherein n represents the number of repeating segments, and is from 100,000 to 300,000.

14. The transfer assist member in accordance with claim 13 wherein said partially conductive represents a surface resistivity of from $10^8$ Ω/square to $10^{10}$ Ω/square as measured by a Resistance Meter.

15. The transfer assist member in accordance with claim 10 wherein said plurality of layers is from 2 layers to 15 layers, and said polyalkylene furandicarboxylate is a bio-based generated polyethylene furandicarboxylate.

16. The transfer assist member in accordance with claim 10 wherein said plurality of layers is from 3 layers to 9 layers.

17. The transfer assist member in accordance with claim 10 wherein said plurality of layers comprise said check film layer, at least one thermoplastic layer, at least one adhesive layer, and a wear resistant layer.

18. The transfer assist member in accordance with claim 17 wherein said thermoplastic layer comprises a polycarbonate.

19. The transfer assist member in accordance with claim 17 wherein said wear resistant layer comprises a polyethylene as represented by the following formula/structure

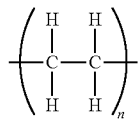

wherein n represents the number of repeating segments from 100,000 to 300,000.

20. The transfer assist member in accordance with claim 17 wherein said member is transfer assist blade.

21. A xerographic process for providing substantially uniform contact between a copy substrate and a toner developed image located on an imaging member comprising:
    providing a flexible transfer assist blade comprising a plurality of attached layers;
    moving said transfer flexible transfer assist blade from a non-operative position spaced from the imaging member to an operative position in contact with the copy substrate in the presence of a corona device; and
    applying pressure against the copy substrate in a direction toward the imaging member, wherein said plurality of layers comprises a check film layer comprising a polyalkylene furandicarboxylate, and thereover a layer comprising a mixture of a conductive component and a polymer, at least one adhesive layer, at least one thermoplastic layer, and a wear resistant layer, where the wear resistant layer is moved into contact with the backside of the copy substrate.

22. The xerographic process in accordance with claim 21 wherein said polyalkylene furandicarboxylate is a bio-based polyethylene furandicarboxylate, and wherein said wear resistant layer is comprised of a polyethylene as represented by the following formula/structure

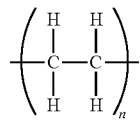

wherein n represents the number of repeating segments from 100,000 to 300,000, and wherein from 95 to 100 percent of the toner developed image is transferred to said copy substrate, and wherein said mixture of said conductive component and said polymer possesses a surface resistivity of from $10^7$ Ω/square to $10^{10}$ Ω/square as measured by a Resistance Meter.

23. A xerographic process in accordance with claim 22 wherein said surface resistivity is from $10^8$ Ω/square to $10^9$ Ω/square as measured by a Resistance Meter.

* * * * *